(12) United States Patent
Tomura et al.

(10) Patent No.: US 7,755,995 B2
(45) Date of Patent: Jul. 13, 2010

(54) RECORDING AND REPRODUCING METHOD FOR DYE-BASED RECORDABLE DVD MEDIUM AND APPARATUS FOR THE SAME

(75) Inventors: Tatsuya Tomura, Tokyo (JP); Tsutomu Sato, Yokohama (JP); Yasunobu Ueno, Yokohama (JP); Soh Noguchi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1160 days.

(21) Appl. No.: 11/371,487

(22) Filed: Mar. 8, 2006

(65) Prior Publication Data

US 2006/0203675 A1    Sep. 14, 2006

(30) Foreign Application Priority Data

Mar. 10, 2005    (JP)    ............................. 2005-067754

(51) Int. Cl.
*G11B 7/00*    (2006.01)
(52) U.S. Cl. ................................. 369/59.11; 369/59.12
(58) Field of Classification Search ........................ None
See application file for complete search history.

(56) References Cited

U.S. PATENT DOCUMENTS

| | | | |
|---|---|---|---|
| 6,737,143 B2 | 5/2004 | Noguchi et al. | |
| 6,794,005 B2 | 9/2004 | Noguchi et al. | |
| 6,936,323 B2 | 8/2005 | Noguchi et al. | |
| 7,385,899 B2 * | 6/2008 | Tomura et al. | 369/59.11 |
| 7,480,223 B2 * | 1/2009 | Noguchi et al. | 369/59.11 |
| 2005/0169148 A1 | 8/2005 | Noguchi et al. | |
| 2005/0201243 A1 * | 9/2005 | Ishimi et al. | 369/59.12 |
| 2005/0282085 A1 | 12/2005 | Yashiro et al. | |

FOREIGN PATENT DOCUMENTS

| | | |
|---|---|---|
| JP | 2004-303400 | 10/2004 |
| JP | 2004-303401 | 10/2004 |

* cited by examiner

*Primary Examiner*—Joseph H Feild
*Assistant Examiner*—Parul Gupta
(74) *Attorney, Agent, or Firm*—Cooper & Dunham LLP

(57) ABSTRACT

To provide a recording and reproducing method for dye-based recordable DVD media, including: recording a mark of the shortest length on a dye-containing recording layer of a dye-based recordable DVD medium using single pulse whose front edge is energized; recording marks other than the shortest thereon using single pulse whose front and rear edges are energized for a given duration, the power of the front edge of pulse being equal to that of the front edge of pulse for the shortest mark, the power of the rear edge of pulse being equal to that of the rear edge of pulse for the shortest mark; and reproducing recorded information using a reproduction beam, wherein the irradiation intensity of cooling pulse provided after the rear edge of pulse upon mark recording is 0.1 mW or less for a given duration, and the recording linear velocity is 42 m/s or more.

16 Claims, 5 Drawing Sheets

Beam incident direction

RECORDING AND REPRODUCING METHOD FOR DYE-BASED RECORDABLE DVD MEDIUM AND APPARATUS FOR THE SAME

BACKGROUND OF THE INVENTION

1. Field of the Invention

The present invention relates to a recording and reproducing method for a dye-based recordable DVD medium on which information can be recorded and from which such information can be reproduced by irradiating it with a light beam to cause its recording layer to undergo optical changes such as transmittance change and reflectivity change, and to an apparatus for the recording and reproducing method.

2. Description of the Related Art

At present development has been underway for recordable digital versatile discs (DVD±R) that can offer enhanced recording speed as large-capacity optical discs. Main technologies for increasing recording capacity involves, for example, development of recording materials that can reduce the length of recording pits, and technical development that can reduce the wavelength of semiconductor laser beams so that image compression formatting technologies as typified by MPEG2 can be adopted for the readout of recording pits.

As semiconductor lasers of red wavelength, only AlGaInP laser diodes of 670 nm wavelength have been commercially utilized in, for example, barcode readers and instrumentation units. Red lasers, however, are now widely used in the optical storage market along with the progression in high-density optical discs. For example, DVD drives are standardized using laser diodes of two different wavelengths for their beam source: 635 nm and 650 nm. Meanwhile, DVD-ROM (Read Only Memory Digital Versatile Disc) drives using beam sources of up to 650 nm wavelength are now commercially available.

In dye-based recordable DVD media in which pits or marks are typically formed with heat mode, the pulse width and recording power of recording pulse of a laser beam applied upon recording are optimized at a particular recording speed, and the status of marks and/or spaces to be formed vary in the other recording linear velocity range, leading to the following problems: insufficient thermal capacity of heating pulses required to form marks, variations in the average mark length due to differences in heat temperatures required before reaching an optimal decomposition temperature, and non-uniform mark widths due to the difference in the duty ratio of an optimal heating pulse, which in turn leads to the generation of thin marks or thick marks according to mark lengths. For these reasons, jitter characteristics undesirably become deteriorated.

In addition, although Japanese Patent Application Laid-Open (JP-A) No. 2004-303400 and other several literatures disclose that high-quality recording can be realized at a recording linear velocity of 42 m/s or less, recording at a recording linear velocity of greater than 42 m/s cannot provide sufficient recording quality depending on the type of recording media.

With respect to physical formats of DVD media, DVD-R media are standardized with a format in which land portions (or so-called land prepits) are partially cut. When this format is applied, prepit information such as prepit addresses cannot be properly reproduced if the land prepit signal (LPPb) is less than 0.16; whereas if the land prepit signal is greater than 0.32, LPP signals themselves behave as noise components in data areas, thus resulting in the frequent occurrence of data errors. Accordingly, there is a disadvantage that the land cut width should be adjusted according to recording material using a stamper, so that the LPPb falls within a range of 0.16 to 0.32.

There are a number of known optical recording media using dyes, and examples thereof include those using as recording material polymethine dyes or combination of polymethine dyes and optical stabilizers; those having a layer made of tetraazaporphyrin (porphyrazin) dye or a combination of cyanine dyes and azometalchelate dyes (salt forming dye), and a reflective layer; those using as recording material a combination of formazane (metal chelate) dye and the other dyes; and those using as recording material a combination of dipyromethene (metal chelate) dye and the other dyes. Furthermore, there are a number of known optical recording media in which dyes are used as recording material for multi-pulse recording.

However, there is no technology that allows single pulse recording to be performed on dye-based recordable DVD media while optimizing the recording waveform for high linear velocity recording and optimizing recording and reproducing operations.

SUMMARY OF THE INVENTION

An object of the present invention is to provide a recording and reproducing method for dye-based recordable DVD media and an apparatus for the same, which can achieve low jitter, low error rate recording for dye-based recordable DVD media at any recording linear velocity, which can perform efficient data writing with the high-frequency wobble format—a format that can be produced easier than the land prepit format used in DVD-Rs, and which can perform recording on dye-based recordable DVD media that use nearly the same format as that for widely available CD-Rs and CD-RWs.

Another object of the present invention is to provide a recording and reproducing method for dye-based recordable DVD media and an apparatus for the same, which provide a new format system for recordable DVD systems that use semiconductor lasers with oscillation wavelengths shorter than those for CD media—an effective system, like the LPP system, for eliminating unrecorded portions in data writing areas; and which are less likely to cause data errors than DVD-R land prepits system, caused due to the necessity of controlling LPP cut width precisely upon preparation of a stamper and due to the leakage of LPP signals in data areas.

The recording and reproducing method of the present invention for dye-based recordable DVD media includes: recording a mark of the shortest length on a dye-containing recording layer by use of a single pulse beam whose front edge is energized; recording marks other than the shortest mark on the dye-containing recording layer by use of a single pulse beam whose front and rear edges are energized for a given duration of time, the power of the front edge of pulse being equal to the power of the front edge of pulse for the shortest mark, the power of the rear edge of pulse being equal to the power of the rear edge of pulse for the shortest mark; and reproducing recorded information by use of a reproduction beam, wherein the irradiation intensity of cooling pulse that comes after the rear edge of pulse at the time of the mark recording is 0.1 mW or less for a given duration of time, and the recording linear velocity is 42 m/s or more, and wherein the dye-containing recording layer is disposed on a substrate of a dye-based recordable DVD medium, the substrate having a guide groove with a wobble. Thus, it is made possible to achieve low jitter, low error rate recording for dye-based recordable DVD media at any recording linear velocity, to perform efficient data writing with the high-frequency wobble format—a format that can be produced easier than the land prepit format used in DVD-Rs, and to perform recording on dye-based recordable DVD media that use nearly the same format as that for widely available CD-Rs and CD-RWs.

The recording and reproducing apparatus of the present invention for dye-based recordable DVD media includes: a dye-based recordable DVD medium having a substrate which has a guide groove with a wobble, and a dye-containing recording layer on the substrate; a recording unit configured to record a mark of the shortest length on the dye-containing recording layer by use of a single pulse beam whose front edge is energized, and record marks other than the shortest mark on the dye-containing recording layer by use of a single pulse beam whose front and rear edges are energized for a given duration of time, the power of the front edge of pulse being equal to the power of the front edge of pulse for the shortest mark, the power of the rear edge of pulse being equal to the power of the rear edge of pulse for the shortest mark; and a reproduction unit configured to reproduce recorded information by use of a reproduction beam, wherein the irradiation intensity of cooling pulse that comes after the rear edge of pulse at the time of the mark recording is 0.1 mW or less for a given duration of time, and the recording linear velocity is 42 m/s or more. Thus, it is made possible to achieve low jitter, low error rate recording for dye-based recordable DVD media at any recording linear velocity, to perform efficient data writing with the high-frequency wobble format—a format that can be produced easier than the land prepit format used in DVD-Rs, and to perform recording on dye-based recordable DVD media that use nearly the same format as that for widely available CD-Rs and CD-RWs.

DESCRIPTION OF THE PREFERRED EMBODIMENTS

Figure 1A:
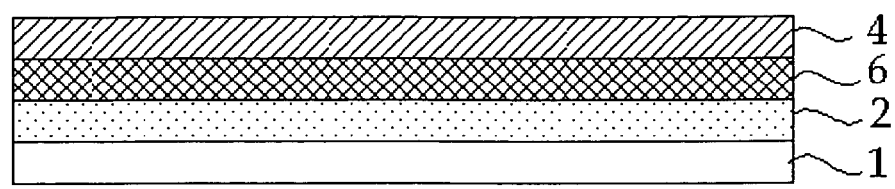
FIG. 1A shows an example of the layer structure of a single-side, single-layer dye-based recordable DVD medium of the present invention.

Recording and Reproducing Method for Dye-Based Recordable DVD Media and a Recording and Reproducing Apparatus for Dye-Based Recordable DVD Media The recording and reproducing method of the present invention for dye-based recordable DVD media includes the following steps: recording a mark of the shortest length on a dye-containing recording layer of a dye-based recordable DVD medium by use of a single pulse beam whose front edge is energized; recording marks other than the shortest one thereon by use of a single pulse beam whose front and rear edges are energized for a given duration of time, the power of the front edge being equal to that of the front edge of pulse for the shortest mark, the power of the rear edge being equal to that of the rear edge of pulse for the shortest mark; and reproducing recorded information by use of reproduction beam, wherein the irradiation intensity of cooling pulse that comes after the rear edge of pulse during the mark recording is 0.1 mW or less for a given duration of time, and the recording linear velocity is 42 m/s or more.

The recording and reproducing apparatus of the present invention for dye-based recordable DVD media includes a dye-based recordable DVD medium, a recording unit, and a reproducing unit, and further includes an additional unit on an as-needed basis.

The recording and reproducing method of the present invention for dye-based recordable DVD media can be suitably realized by the recording and reproducing apparatus of the present invention for dye-based recordable DVD media.

The single pulse beam in the present invention is a basic optimal pulse irradiation pattern, in which a mark of the shortest length is recorded on a dye-containing recording layer of a dye-based recordable DVD medium by use of a single pulse beam whose front edge is energized; and marks other than the shortest one are recorded thereon by use of a single pulse beam whose front and rear edges are energized for a given duration of time, the power of the front edge being equal to that of the front edge of pulse for the shortest mark, the power of the rear edge being equal to that of the rear edge of pulse for the shortest mark.

The pulse duration for the second shortest mark and other longer marks (i.e., marks other than the shortest one) where the front and rear edges are energized with the addition of additional power is preferably 0.2 to 2.5 times the basic clock cycle T (i.e., 0.2T to 2.5T), more preferably 0.5T to 2T.

In addition, the pulse duration for the shortest mark where the front edge is energized is preferably 0.2T to 2.0T, more preferably 0.3T to 1.5T. The front edge of pulse for the shortest mark, and the front and rear edges of pulse for the other marks are all energized, with the intensity of the front edge of pulse for the shortest mark being equal to that of the front edge of pulse for the other marks, and the intensity of the rear edge of pulse for the shortest mark being equal to that of the rear edge of pulse for the other marks.

If the power of the energized front edge of pulse for each mark is defined as W0, the power of the rear edge of pulse for each mark as W1, and the power of pulse for marks other than the shortest one without added power as W2, W0/W1 is preferably in a range of 1.01 to 2.00, more preferably in a range of 1.02 to 1.50, and W1/W2 is preferably in a range of 1.05 to 3.00, more preferably in a range of 1.08 to 2.00.

A preferable condition under which cooling pulse that comes after the rear edge of pulse is applied is such that its duration is 1/6 to 6/6 the shortest space length. If the duration of cooling pulse is outside of this range, it may sometimes difficult to obtain the effects of the present invention. Selecting a pulse waveform described above can realize low jitter recording especially at higher linear recording velocities.

Dye-based optical recording media require large recording powers to achieve recording at higher linear recording velocities, thus resulting in the increase in the likelihood of the occurrence of thermal influences between adjacent marks. To avoid this, the present invention can be effectively used to sharpen well the edges of marks. Recording with conventional technologies entails the generation of gap between the power that can produce the least jitter and the power that can achieve a minimal occurrence of errors, leading to the reduction in power margin. To be more specific, at a recording power where the least jitter is obtainable at a high recording linear velocity of 42 m/s or more, the asymmetry of a recording signal tends to shift to the minus side, and thus errors are likely to occur even with lower jitter. For example, when even recording signals are of minus asymmetry, jitter is low, and the number of errors is small, errors are more likely to occur in optical recording media with such features than those in which information is recorded by use of recording signals with near zero asymmetry due to deterioration of optical recording media and/or drives over time or due to reduction in the effective irradiation power caused by dirt on lens.

Even when multi-pulse beam is used for the recording of one mark, the foregoing low asymmetry problem can be solved by optimizing it. The use of such a multi-pulse beam, however, causes difference in rising duration and falling duration among pulses, possibly resulting in the fluctuations in recording quality. It goes without saying that the higher the linear recording velocity is, the more likely such fluctuations occur. The present invention, by contrast, uses single pulse to record one mark, and is thus advantageous over the foregoing multi-pulse recording method in terms of its capability of providing a recording method with less fluctuation in recording quality. Furthermore, since the present invention uses a simpler recording waveform than that of multi-pulse method for addressing during a writing operation, it is easy to equalize the beam intensity during a recording operation, addressing can be done while equalizing not only the reflected beam intensity at space areas but also the beam intensity at mark areas, and addressing can be relatively readily done even when the irradiation intensity of cooling pulse that comes after rear edge of pulse is 0.1 mW or less for a given duration of time.

The present invention aims to improve recording quality at a recording linear velocity of 42 m/s or more. In high speed recording how uniform the formed shortest mark significantly is affects recording quality. Thus, the present invention aims to improve the quality of the shortest mark by energizing the front edge of pulse for the shortest mark, so that the mark is formed uniformly with reliability. In addition, the present invention aims to improve recording quality by energizing the front edge of pulse for marks other than the shortest one and by energizing the rear edge of the pulse at a level lower than the front edge. Energizing the rear edge of pulse for marks other than the shortest one contributes to an improvement in asymmetry; in other words, although energizing only the front edge of pulse for marks other than the shortest one improve jitter, at least energizing the rear edge of pulse is effective to solve the foregoing low asymmetry problem which the present invention tackles.

Figure 4:
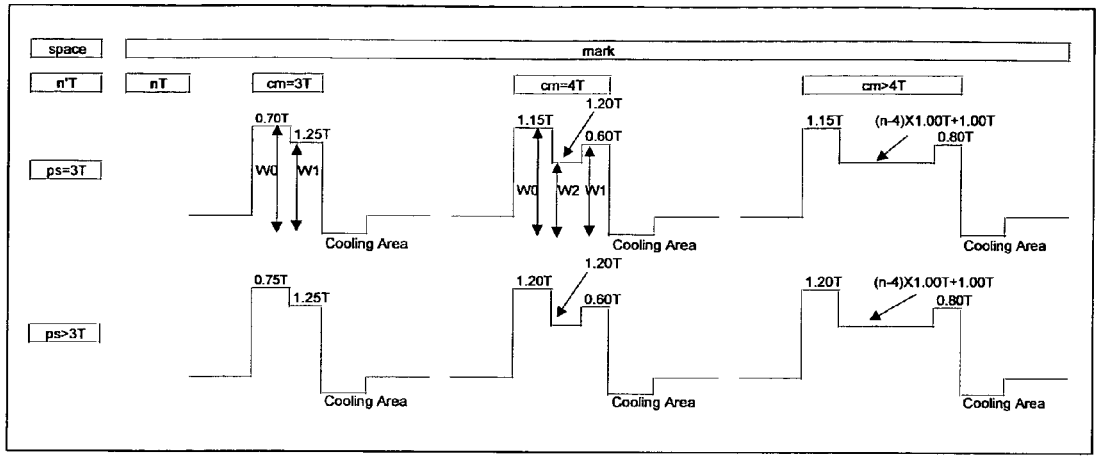
FIG. 4 shows an example of power control waveforms of the present invention for recording at a recording linear velocity of 42 m/s.
Figure 5:
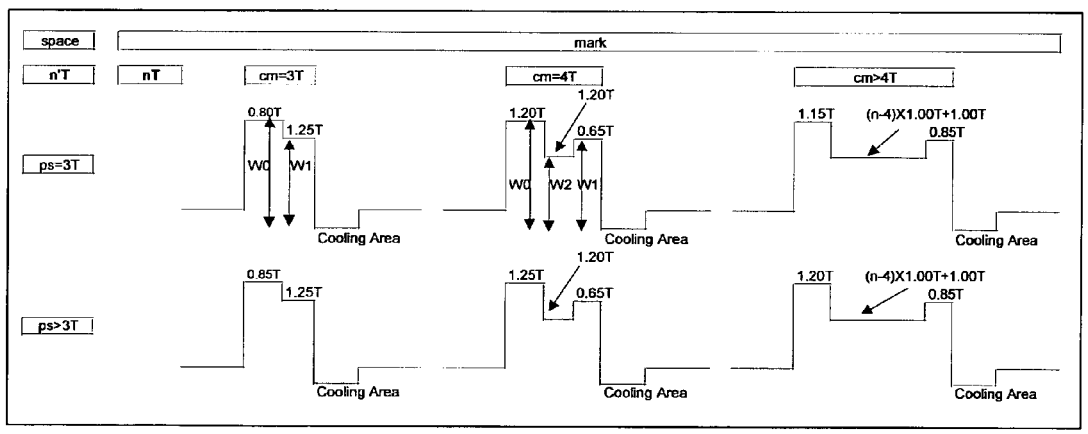
FIG. 5 shows an example of power control waveforms of the present invention for recording at a recording linear velocity of 56 m/s.

FIGS. 4 and 5 each show an example of the recording waveform in the present invention.

In the present invention, in view of thermal influences, the heating pulse width of recording pulse for forming a mark immediately before which there is a space of the shortest length is identified depending on whether the length of that mark is the shortest, and the heating pulse width for the shortest mark is set larger than those for the other longer marks. In this way it is possible to realize recording with lower jitter.

Moreover, the heating pulse width of recording pulse for a mark of the shortest length is identified depending on whether the space immediately before the shortest mark is the of the shortest length, and the heating pulse width for the mark immediately before which there is the shortest space is set smaller than those for the other marks immediately before which there is no space of the shortest length. In this way it is possible to realize recording with lower jitter.

The compensation level (duration) for reducing the heating pulse width is preferably in a range of 0.02T to 0.10T. If the pulse width for a mark, immediately before which there is a space of the shortest length, is substantially equal to those for the other marks, the space in question is made shorter due to thermal influences, resulting in a slight increase in jitter. Thus, only in such a case, reducing the heating pulse width for mark recording is effective. Note that it goes without saying that shortening the front edge of heating pulse is effective for the reduction of pulse width.

If the space immediately before a mark to be formed is of the shortest and the heating pulse width for that mark is shorter than 0.10T, the mark itself is made too short, which is not preferable.

The compensation level (duration) for setting the heating pulse width for the shortest mark larger than those for the other marks is preferably in a range of 0.05T to 0.25T. The formation of the shortest mark is especially difficult in a case where a higher recording linear velocity is set; therefore, the pulse width is made longer within the foregoing compensation range.

Table 1 lists specific examples of compensation levels for heating pulse width.

TABLE 1

| | | Length of mark to be recorded | |
|---|---|---|---|
| | | 3 T | 4 T to 14 T |
| Length of space immediately before a mark to be recorded | 3 T | ±0.00 T (not compensated) | −0.05 T |
| | 4 T to 14 T | +0.05 T | ±0.00 T (not compensated) |

For the optical characteristics of the dye-containing recording layer, the refractive index "n" of a single dye-containing recording layer for beams of longer wavelengths near the recording and reproducing wavelengths—beams of wavelengths within ±5 nm of the recording and reproducing wavelengths—is preferably set such that $1.5 \leq n \leq 3.0$. If the refraction index of the single dye-containing recording layer is less than 1.5, it is difficult to obtain sufficient optical changes and may causes reduction in the recording modulation degree. If the refraction index exceeds 3.0, wavelength dependency becomes remarkable, and thus errors may occur even at recording and reproducing wavelengths.

Here, dye-containing films were formed on the substrates prepared in Example 1 to be described later so that the films have a refractive index of 1.4, 1.5, and 1.6, respectively, and the reflectivity of the non-recorded portions of each film is 0.43%, 0.46%, and 0.47%, respectively, suggesting that the refractive index of 1.5 or more is suitable to satisfy the reflectivity required in the recordable DVD specification: 0.45% or more. Meanwhile, the upper limit of the refractive index is specified because there are no organic compounds with refractive index of greater than 3.0.

Moreover, the extinction coefficient k of a single dye-based recording layer for beams of wavelengths within ±5 nm of recording and reproducing wavelengths is preferably set such that $0.02 \leq k \leq 0.2$. If the extinction coefficient is less than 0.02, recording sensitivity may be reduced, whereas if the extinction coefficient exceeds 0.2, it may be difficult to obtain a reflectivity of 50% or more. Here, an optimal recording power was determined for each of dye-containing films, formed on the substrates prepared in Example 1 to be described later and respectively have an extinction coefficient of 0.01, 0.02, and 0.03. The optical recording power of them was respectively determined to be 1.45, 1.0, and 0.99, with the optical recording power for the film with an extinction coefficient of 0.02 being set to 1.0. Thus, in view of recording sensitivity characteristics, the proper lower limit of the extinction coefficient is 0.02. In addition, dye-containing films were formed on the substrates prepared in Example 1 to be described later so that they respectively have an extinction coefficient of 0.19, 0.20, and 0.21. The reflectivity of non-recorded portions was determined to be 0.4% for the film with an extinction coefficient of 0.19, 0.46% for the film with an extinction coefficient of 0.20, and 0.43% for the film with an extinction coefficient of 0.21, leading to the conclusion that the proper extinction coefficient is 0.2 or less in order to satisfy the reflectivity specification of recordable DVDs: 0.45% or more.

Although DVD-ROMs are typically standardized near 650 nm wavelength for read-only drives, the wavelength of a recording beam for recordable media is standardized at 650 nm to 660 nm for popular applications in addition to 635 nm for authoring exclusive media. This wavelength range, however, is just central wavelength range and shifts to longer or shorter wavelengths due to the fluctuations in the manufacturing process for laser diodes (LD). Furthermore, an increase in the temperature of LDs typically causes their recording wavelength to shift to longer wavelengths. The recording method of the present invention is operable within the wavelength range of 600 nm to 720 nm, which covers the wavelength range described above.

The wobble characteristics of guide grooves to be formed on a substrate will be described below. "T" is the basic clock cycle for specifying a wobble frequency. A wobble frequency band equivalent to 150T to 400T is usually used. The frequency band may, however, not be suitable for high density recording because, when data is to be added by means of either frequency modulation or phase modulation, the newly added data is undesirably separated at a great distance from prior data due to too low wobble frequency. To avoid this, recordable DVD-Rs are provided with LPP, by which the location where data is recorded is controlled using LPP signals.

In this LPP system, addressing is done with LPP, and DVD-Rs also use a wobble signal to determine the final location where new data are to be added; the wobble cycle in a DVD-R is set to 186T (wobble frequency for 1× speed: 140.6 kHz) for this positioning, leading to large spaces between the added data. Moreover, signals may not be read properly when the amplitude of the LPP signal is excessively small. On the other hand, when the amplitude of the LPP signal is excessively large data errors arise frequently due to the crosstalk of the LPP signal in written data, posing limitation to LPP: LPP should be set such that $0.16 \leq LPPb \leq 0.32$, more preferably $0.18 \leq LPPb \leq 0.26$. Accordingly, the cut width of lands should be controlled precisely upon preparation of a stamper. However, employing a high-frequency wobble eliminates the need for using the LPP system, and synchronization is performed by modulating wobble. For this reason, the frequent occurrence of data errors as seen in the LPP system can be avoided. As specified in the present invention, the preferred high-frequency wobble is 4T to 96T. If the wobble frequency is less than 4T, it is difficult to detect such a high-frequency wobble and thus problems occur with respect to rotation control and reliability of address detection. It has been established that wobble frequency of 4T or less cannot be appropriately detected even when a disc is rotated at a low speed of 3.5 m/s, and that there is a threshold of 4T at which such wobble frequency can be detect. To be more specific, at frequencies of 5T and 4T, wobble word error rates are 0.2% and 0.3%, respectively, whereas wobble word error rate is 1.4% at 3T, meaning that there is a distinct threshold. Note that measurements are made under the same conditions described Example 1, except for the wobble condition.

If the wobble frequency is greater than 96T, space intervals between additionally recorded data are excessively large, resulting in a reduced capacity or an insufficient data processing speed. More specifically, when data is to be added to a disc with a wobble of 96T, there may be spaces corresponding to up to 96 channel bits between data sets. This data loss increases as the number of rewriting increases. A wobble with a frequency of 96T or greater cannot be adopted in order to insure 4.7 GB as required in DVD specification. Since there is a possibility that user areas cannot be secured, a spare area of about 1,000,000 bits may be provided at the outermost periphery of the disc, for example. The user areas are so designed that they are capable of coping with rewriting of ten million times. The remaining 40,000 bits—subtraction of 960,000 bits from 1,000,000 bits—is provided as a second spare area.

The amplitude of a wobble signal in the DVD medium is chosen such that $0.1 \leq Wo/PP \leq 0.4$, where Wo is the amplitude of a wobble signal which has been passed through high-pass and low-pass filters (e.g., a high-pass filter of 4 MHz and a low-pass filter of 30 kHz), and PP is the amplitude of a push-pull signal which has been passed through high-pass and low-pass filters (e.g., a low-pass filter of 30 kHz). In this way synchronization using a wobble signal, which is the object of the present invention, is relatively readily performed. The amplitude of a wobble signal is preferably chosen such that $0.15 \leq Wo/PP \leq 0.30$. If Wo/PP is less than 0.1, signal intensity is insufficient for synchronization; if Wo/PP is greater than 0.4, the number of data errors tends to increase. This high-frequency wobble system has less affect on the occurrence of data errors in media with large LPP signal amplitude than does the LPP system, and the increase in the number of data errors associated with the increase in the amplitude of the wobble signal is gradual.

If the Wo/PP value is less than 0.1, wobble detection is impossible or the reliability of wobble detection is significantly reduced. If the Wo/PP value is 0.1 or greater, it is possible to secure wobble detection reliability, and the following relationships are established.

For Wo/PP=0.098, wobble word error rate is 1.4%;

For Wo/PP=0.100, wobble word error rate is 0.4%; and

For Wo/PP=0.102, wobble word error rate is 0.3%

For the upper limit of Wo/PP, sample optical recording media with different Wo/PP values of 0.350, 0.375, 0.40, 0.425, and 0.450 and similar configurations as those of optical recording media described in later-described Example 1 were prepared, followed by a recording operation in the same manner described in Example 1. The number of PI errors was then determined for the recorded data to give the following results:

For Wo/PP=0.350, the number of PI errors was 6;

For Wo/PP=0.375, the number of PI errors was 8;

For Wo/PP=0.400, the number of PI errors was 10;

For Wo/PP=0.425, the number of PI errors was 100; and

For Wo/PP=0.450, the number of PI errors was 150.

These results provides the fact that once the Wo/PP value exceeds 0.400, snaking wobble signals begin to affect adversely the data areas to dramatically increase the number of PI errors.

An advanced, cut width-controlling technique is needed to cause LPP cut width in the LPP system to fall within the foregoing range of 0.16 to 0.32 upon preparation of a stamper. This can be achieved, however, by the high-frequency wobble system of the present invention only when a high-frequency generation source and the wobble frequency range are properly managed (any wobble frequency range can be set with excellent reproducibility by use of a circuit intended for that purpose); therefore, the yields of stampers and DVD media can be increased remarkably.

With respect to the shape of grooves in the substrate having the foregoing format, the groove depth is preferably 100 nm to 250 nm (1,000 angstroms to 2,500 angstroms), more preferably 150 nm to 200 nm (1,500 angstroms to 2,000 angstroms) in a case that dye-containing recording layers are formed by a solvent-coating process using organic dyes. When the groove depth is less than 100 nm (1,000 angstroms), tracking control sometimes becomes inoperable due to insufficient push-pull signals, whereas if the grove depth is greater than 250 nm (2,500 angstroms), the transferability of a formed substrate may be reduced during substrate molding. When wobble frequency is defined as mT (where m natural number), the dye groove depth d1, at the time when a dye-containing recording layer is provided, preferably satisfies the relationship: $1,200 \leq (d1 \times m) \leq 160,000$, where m is a natural number.

If (d1×m) is less than 1,200, sufficient subtraction signals cannot be obtained, and tracking may not be performed properly at the time of a recording or reproducing operation. If (d1×m) is greater than 160,000, oscillation may occur to adversely affect tracking. The groove depth of the substrate is typically limited by the limitation of transferability of the substrate as described above, and thus the practical upper limit of groove depth is 160,000.

The track pitch is preferably 0.64 μm to 0.8 μm in order to secure storage capacity of 4 GB to 5 GB. The groove width generally depends on the recording material; usually the half-value width of 0.18 μm to 0.40 μm can be applied for almost all organic materials.

The recording and reproducing method of the present invention for dye-based recordable DVD media has features as described above, and is used for various types of optical recording media. In particular, the recording and reproducing method of the present invention can be suitably used for a single-side, single-layer optical recording medium, double-side optical recording medium, and single-side, double-layer optical recording medium described below.

<Single-Side, Single-Layer Optical Recording Medium>

The single-side, single-layer optical recording medium includes at least a dye-containing recording layer and a reflective layer on a substrate, and a protective substrate bonded to the substrate with an adhesive layer interposed therebetween, and further includes an additional layer on an as-needed basis.

Figure 1B:
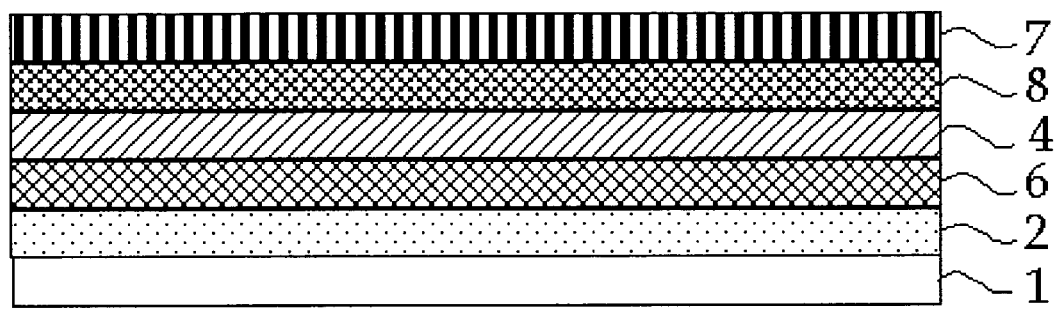
FIG. 1B shows another example of the layer structure of the single-side, single-layer dye-based recordable DVD medium of the present invention.
Figure 1C:
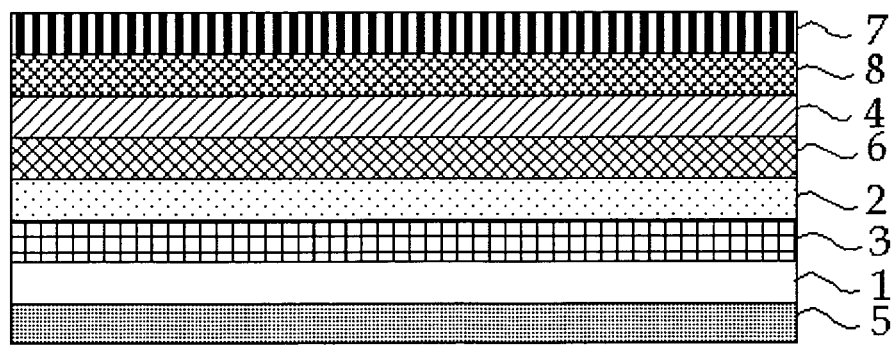
FIG. 1C shows still another example of the layer structure of the single-side, single-layer dye-based recordable DVD medium of the present invention.

Here, FIGS. 1A to 1C are schematic cross-sectional views each showing an example of the layer structure of a single-side, single-layer recordable optical recording medium of the present invention, which may be either a DVD+R disc or DVD-R disc.

FIG. 1A shows a DVD+R disc or DVD-R disc, which is composed of a substrate 1, dye-containing recording layer 2, reflective layer 6 and protective layer 4.

FIG. 1B shows a DVD+R disc or DVD-R disc, which is composed of a substrate 1, dye-containing recording layer 2, reflective layer 6, protective layer 4, adhesion layer 8 and protective substrate 7.

FIG. 1C shows a DVD+R disc or DVD-R disc, which is composed of a hard coat layer 5, substrate 1, undercoat layer 3, dye-containing recording layer 2, reflective layer 6, protective layer 4, adhesive layer 8 and protective substrate 7.

Preferred basic structures of dye-based recordable DVD media to which the present invention can be suitably applied are those shown in FIGS. 1B and 1C, which show structures obtained by bonding first and second substrates together by use of an adhesive, with a dye-containing recording layer interposed between them.

—Substrate—

When performing at least one of recording and reproducing operations from the substrate side, the substrate must be transparent to laser beams. When performing at least one of recording and reproducing operations from the recording layer side, the substrate does not need to be transparent to laser beams. Accordingly, when two substrates are bonded together like a sandwich in the present invention, only one of the two substrates (e.g., first substrate) needs to be transparent; the other (e.g., second substrate) may be either transparent or not.

Examples of materials available for the substrate include, but not limited to, plastics such as polyester resins, acrylic resins, polyamide resins, polycarbonate resins, polyolefin resins, phenol resins, epoxy resins and polyimide resins; glass; ceramics; and metals. These materials can be selected depending on the intended use. When only one substrate is to be used, guide grooves and guide pits for tracking and preformats such as address signals are preferably formed on the surface of that substrate, whereas when two substrates are bonded together like a sandwich for use, these components are preferably formed on the surface of the first substrate.

The substrate is disc-shaped and has grooves of 1000 angstroms to 2500 angstroms (100 nm to 250 nm) width. The groove width is preferably 0.18 μm to 0.36 μm in terms of half-value width. Grooves with a half-value width of 0.18 μm or more are preferable because it is easy to obtain sufficient intensity of tracking error signals, and grooves with a half-value width of 0.36 μm or less are preferable because recorded areas are less likely to spread.

In addition, track pitch is preferably 0.7 μm to 1.0 μm, more preferably 0.7 μm to 0.8 μm for large capacity purposes.

—Dye-Containing Recording Layer—

The dye-containing recording layer undergoes some optical changes upon irradiation to a laser beam and thereby information is recorded thereon. Materials for such a dye-containing recording layer contain organic dyes as a major component. Here, the term "major component" means that the dye-containing recording layer contains organic dyes in amounts sufficient to perform recording and reproducing operations; however, the dye-containing recording layer typically contains only organic dyes, except for trace amounts of additives to be added depending on the circumstances.

Examples of organic dyes include azo dyes, formazan dyes, dipyrromethene dyes, (poly)methyne dyes, naphtalocyanine dyes, phthalocyanine dyes, tetraazaporphyrin dyes, squarylium dyes, chloconium dyes, pyrylium dyes, naphthoquinone dyes, anthraquinone dyes (indanthrene dyes), xanthene dyes, triphenylmethane dyes, azulene dyes, tetrahydrocoline dyes, phenanthrene dyes, triphenothiazine dyes, and metal complexes thereof. These organic dyes may be used singly or in combination. Among these organic dyes, azo dyes (metal chelates), formazan dyes (metal chelates), squarylium dyes (metal chelates), dipyrromethene dyes (metal chelates), trimethynecyanine dyes and tetraazaporphyrin dyes are most preferable.

As the thermal decomposition characteristics of the dyes, the temperature at which these dyes begin to decompose (or initial decomposition temperature) is preferably 100° C. to 360° C., more preferably 100° C. to 350° C. If the initial decomposition temperature is greater than 360° C., pit formation during recording cannot be done successfully, which may cause reduction in jitter characteristics. If the initial decomposition temperature is less than 100° C., the storage stability of discs may be reduced.

Metals or metal compounds may be added to the foregoing dyes; examples of such additional metals and metal compounds include In, Te, Bi, Se, Sb, Ge, Sn, Al, Be, $TeO_2$, SnO, As and Cd. These metals and metal compounds may be dispersed and mixed together before use, or may be used in the form of a laminate.

Furthermore, the foregoing dyes may be mixed with polymer materials; for example, ionomer resins, polyamide resins, vinyl resins, natural polymers, silicones, liquid rubbers, and/or silane coupling agents may be dispersed and mixed with them before use. Alternatively, stabilizers (e.g., transition metal complexes), dispersing agents, flame-retardants, lubricants, antistatic agents, surfactants, and/or plasticizers may be used together for the purpose of improving their characteristics.

The dye-containing recording layer can be formed with a general method: vapor deposition, sputtering, CVD, or coating.

The coating method can be performed by dissolving the foregoing dyes or the like in an organic solvent or the like to prepare a coating solution and by applying it onto a disc with a conventional coating method, such as spraying, roller coating, dipping or spin coating.

The organic solvent is not particularly limited and can be appropriately selected depending on the intended use; examples thereof include alcohols such as methanol, ethanol, isopropanol and 2,2,3,3-tetrafluoropropanol; ketones such as acetone, methyl ethyl ketone and cyclohexanone; amides such as N,N-dimethylformamide and N,N-dimethylacetamide; sulfoxides such as dimethylsulfoxide; ethers such as tetrahydrofuran, dioxane, diethylether and ethyleneglycol monomethylether; esters such as methyl acetate and ethyl acetate; aliphatic halogenated hydrocarbons such as chloroform, methylene chloride, dichloroethane, carbon tetrachloride and trichloroethane; aromatics such as benzene, xylene, monochlorobenzene and dichlorobenzene; cellosolves such as methoxy ethanol and ethoxy ethanol; and hydrocarbons such as hexane, pentane, cyclohexane, and methyl cyclohexane.

The thickness of the dye-containing recording layer is not particularly limited, and is appropriately set to 100 angstroms (10 nm) to 10 μm.

—Undercoat Layer—

The undercoat layer is provided for the following purposes: (1) improvement in adhesion properties; (2) protection against water and gas; (3) improvement in the storage stability of a dye-containing recording layer; (4) protection of substrates and dye-containing recording layer against solvents; and (5) formation of guide grooves, guide pits, preformats and so forth.

To achieve the purpose (1), various polymer materials such as ionomer resins, polyamide resins, vinyl resins, natural resins, natural polymers, silicones and liquid rubbers, and silane coupling agents and the like can be used. To achieve the purposes (2) and (3), inorganic compounds such as $SiO_2$, $MgF_2$, SiO, $TiO_2$, ZnO, TiN and SiN can be used in addition to the above-described polymer materials. Furthermore, metals and semi-metals such as Zn, Cu, Ni, Cr, Ge, Se, Au, Ag, and Al can be used. To achieve the purpose (4), metals such as Al and Ag, and organic thin films having metallic luster such as methine dyes and xanthenes dye can be used. To achieve the purposes (5) and (6), ultraviolet curable resins, thermosetting resins and thermoplastic resins can be used.

The thickness of the undercoat layer is not particularly limited and can be appropriately set depending on the intended use; preferably, the thickness is 0.01 μm to 30 μm, more preferably 0.05 μm to 10 μm.

—Reflective Layer—

Examples of materials of the reflective layer include metals and semi-metals with corrosion resistance that offer high reflectivity when used by themselves, such as Au, Ag, Cr, Ni, Al, Fe and Sn. Among these, Au, Ag and Al are most preferable in view of their reflectivity and the productivity of reflective layers. These metals and semi-metals may be used singly or as an alloy of two different elements.

The reflective layer can be formed with any of various types of vapor deposition methods, such as vacuum deposition, sputtering, plasma CVD, optical CVD, ion plating, or electron beam-deposition. However, sputtering is excellent in terms of its mass-productivity and film quality.

The thickness of the reflective layer is not particularly limited and can be appropriately set depending on the intended use; the thickness is preferably 50 angstroms to 5000 angstroms (5 nm to 500 nm), more preferably 100 angstroms to 3000 angstroms (10 nm to 300 nm).

—Protective Layer and Hard Coat Layer—

The protective layer and the hard coat layer are provided for the following purposes: (1) protection of the dye-containing recording layer or reflection absorbing layer against damages, dusts, and dirts; (2) improvement in the storage stability of the dye-containing recording layer; (3) and improvement in reflectivity. To achieve these purposes, materials similar to those for the foregoing intermediate layers can be used; for inorganic materials, SiO, $SiO_2$ and the like can be used, and for organic materials, thermoplastic resins, heat-fusible resins and ultraviolet curable resins can be used; examples thereof include polymethacrylate resins, polycarbonate resins, epoxy resins, polystyrene resins, polyester resins, vinyl resins, celluloses, aliphatic hydrocarbon resins, aromatic hydrocarbon resins, natural rubbers, styrene-butadiene resins, chloroprene rubbers, waxes, alkyd resins, drying oils and rosins. Among these, ultraviolet curable resins are preferable for the protective layer and hard coat layer from the view point of their productivity.

The thickness of the protective layer and hard coat layer is not particularly limited and can be appropriately set depending on the intended use; the thickness thereof is preferably 0.01 μm to 30 μm, more preferably 0.05 μm to 10 μm.

The undercoat layer, protective layer, and hard coat layer of the single-layer optical recording medium may further contain stabilizers, dispersing agents, flame-retardants, lubricants, antistatic agents, surfactants and/or plasticizers on an as-needed basis, as in the case of the dye-containing recording layer.

—Protective Substrate—

The protective substrate needs to be transparent to a laser beam when the optical recording medium is irradiated with the laser beam from the protective substrate side. However, if the protective substrate merely functions as a protective plate, this transparency is not required. The materials for the protective substrate are identical to those for the substrate described above; for example, plastics such as polyesters, acrylic resins, polyamides, polycarbonate resins, polyolefin resins, phenol resins, epoxy resins, and polyimides; glass; ceramics; and metals can be used.

—Adhesive and Adhesive Layer—

The adhesive is not particularly limited as long as it can bond two optical recording media together, and can be appropriately selected depending on the intended use; in view of productivity, ultraviolet curable adhesives and hot-melt adhesives are preferably used.

<Double-Side Optical Recording Media>

Figure 2:
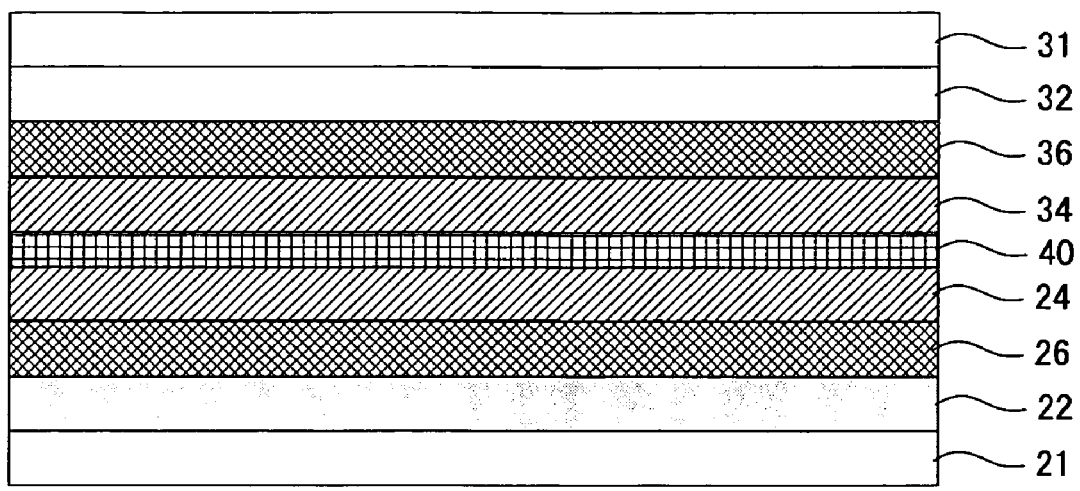
FIG. 2 is a schematic cross-sectional view showing an example of a double-side dye-based recordable DVD medium of the present invention.

The double-side optical recording medium is one formed by bonding together the two single-side, single-layer optical recording media shown in FIGS. 1A to 1C, with their substrate directed to the outside. For example, as shown in FIG. 2, the double-side optical recording medium includes a layer structure in which a first substrate 21, first dye-containing recording layer 22, first reflective layer 26, first protective layer 24, adhesive layer 40, second protective layer 34, second reflective layer 36, second dye-containing recording layer 32, and second substrate 31 are provided.

An adhesive used in the adhesive layer is preferably selected from those capable of bonding two optical recording media together and absorb as small an amount of light as possible at the wavelengths of beams for recording and reproducing; for example, ultraviolet curable resins and thermoplastic resins can be used.

The thickness of the adhesive layer is preferably 10 μm to 200 μm, more preferably 30 μm to 120 μm.

For the first substrate 21, second substrate 31, first dye-containing recording layer 22, second dye-containing recording layer 32, first reflective layer 26, second reflective layer 36, first protective layer 24 and second protective layer 34 in the double-side optical recording medium, components similar to those used in the foregoing single-side optical recording medium can be appropriately used depending on the intended use.

<Single-Side, Double-Layer Optical Recording Media>

The single-side, double-layer optical recording medium includes first and second substrates; and a first information layer, intermediate layer and second information layer, which are disposed in this order between the first and second substrates, and further includes an additional layer on an as-needed basis.

The first information layer includes a first dye-containing recording layer, first reflective layer and first protective layer in this order from the laser beam incident side, and further includes an additional layer on an as-needed basis.

The second information layer includes a second protective layer, second dye-containing recording layer and second reflective layer in this order from the laser beam incident side, and further includes an additional layer on an as-needed basis.

Figure 3:
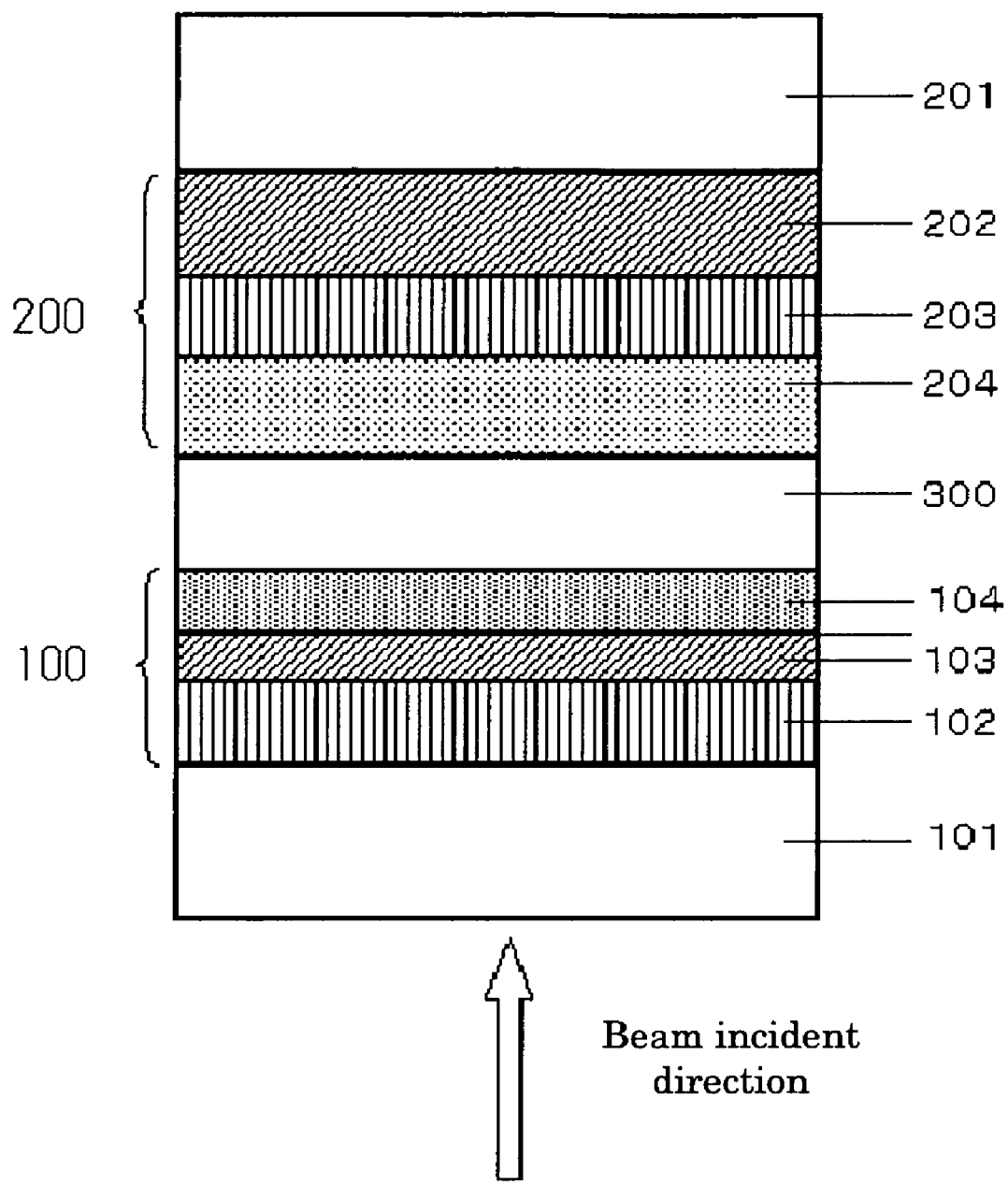
FIG. 3 is a schematic cross-sectional view showing an example of a single-side, double-layer dye-based recordable DVD medium of the present invention.

FIG. 3 is a schematic cross-sectional view of a single-side, double-layer dye-based recordable DVD medium according to one embodiment of the present invention.

The single-side, double-layer dye-based recordable DVD disc shown in this drawing has two information layers, each of which is made of organic dye material. Information recording for each layer is performed in the following manner: a laser beam is launched into the disc from the first substrate 101 to form record patterns called marks. More specifically, the first information layer 100 is formed on the first substrate 101 provided with guide grooves.

The first information layer 100 is a laminate obtained by sequentially stacking a first dye-containing recording layer 102, first reflective layer 103 and first protective layer 104 on the first substrate 101. A undercoat layer or a protective layer may be provided between the first dye-containing recording layer 102 and the first substrate 101; such a layer may be combined with the other layers for the improvement of its function.

Meanwhile, the second information layer 200 is formed on the second substrate 201 provided with guide grooves. The second information layer 200 is a laminate obtained by sequentially stacking the second reflective layer 202, second dye-containing recording layer 203 and second protective layer 204 on the second substrate 201.

The first and second information layers 100 and 200 are bonded together with the substantially transparent adhesive layer 300, an intermediate layer, and are separated at a predetermined distance in such a way that they face each other.

The adhesive (intermediate) layer 300 preferably absorbs as small an amount of light as possible at the wavelength of beams for recording and reproducing. Resins are suitable materials for the adhesive layer 300 in view of their moldability and costs; for example, ultraviolet curable resins and thermoplastic resins can be used. In addition, two-sided tapes for optical disc bonding (e.g., a pressure-sensitive adhesive sheet produced by Nitto Denko Corporation, product name: DA-8320) can also be used. The adhesive (intermediate layer) 300 allows an optical pickup to optically distinguish the first and second information layers 100 and 200 from each other during recording and reproducing operations.

The thickness of the intermediate layer is preferably 10 μm to 70 μm, more preferably 20 μm to 70 μm. If the thickness of the intermediate layer is less than 10 μm, it may result in crosstalk between layers, whereas if the thickness is greater than 70 μm, spherical aberration occurs during recording and reproducing operations for the second information layer, which may make these operations difficult.

For the first substrate 101, second substrate 201, second substrate 201, first dye-containing recording layer 102, second dye-containing recording layer 203, first reflective layer 103, second reflective layer 202, first protective layer 104 and second protective layer 204 of the single-side, double-layer optical recording medium of the present invention, components similar to those for the foregoing single-side, single-layer optical recording medium can be appropriately used depending on the intended use.

It should be noted that a barrier layer (or second protective layer) 204 may be provided between the second dye-containing recording layer 203 and the adhesive (intermediate) layer 300 in order to protect the second dye-containing recording layer 203 against chemical and physical damages.

<Recording and Reproducing Apparatus for Dye-Based Recordable DVD Media>

The recording and reproducing apparatus of the present invention for dye-based recordable DVD media includes a dye-based recordable DVD medium, a recording unit, and a reproducing unit, and further includes an additional unit on an as-needed basis.

The recording unit records a mark of the shortest length by use of a single pulse beam whose front edge is energized, and records marks other than the shortest one by use of a single pulse beam whose front and rear edges are energized for a given duration of time, the power of the front edge being equal to that of the front edge of pulse for the shortest mark, the power of the rear edge being equal to that of the rear edge of pulse for the shortest mark.

During this mark recording process by means of the recording unit, the irradiation intensity of cooling pulse that comes after the rear edge of pulse is 0.1 mW or less for a given duration of time, and the recording linear velocity is 42 m/s or more.

Optical discs are used as media for storing a large amount of information, and such information is typically recorded on and reproduced from them by means of an optical disc drive, or a recording and reproducing apparatus. Here, the configurations of the optical disc drive and optical disc will be described.

For such optical discs, dye-based recordable DVD media are used; examples thereof include DVD-RAM•WOs, DVD-Rs, DVD+Rs, DVD-RAMs, DVD-RWs and DVD+RWs. Note that DVD-RWs and DVD+RWs are writable (or recordable) DVDs (Digital Versatile Discs). DVD-RAM•WOs, DVD-Rs and DVD+Rs are write-once discs (also referred to as DVD Write Once). DVD-RAMs, DVD-RWs, and DVD+RWs discs are rewritable DVD discs. Information is recorded on and reproduced from these DVD+Rs and DVD+RWs, or optical discs, by means of an optical disc drive as shown in FIG. 6.

Figure 6:
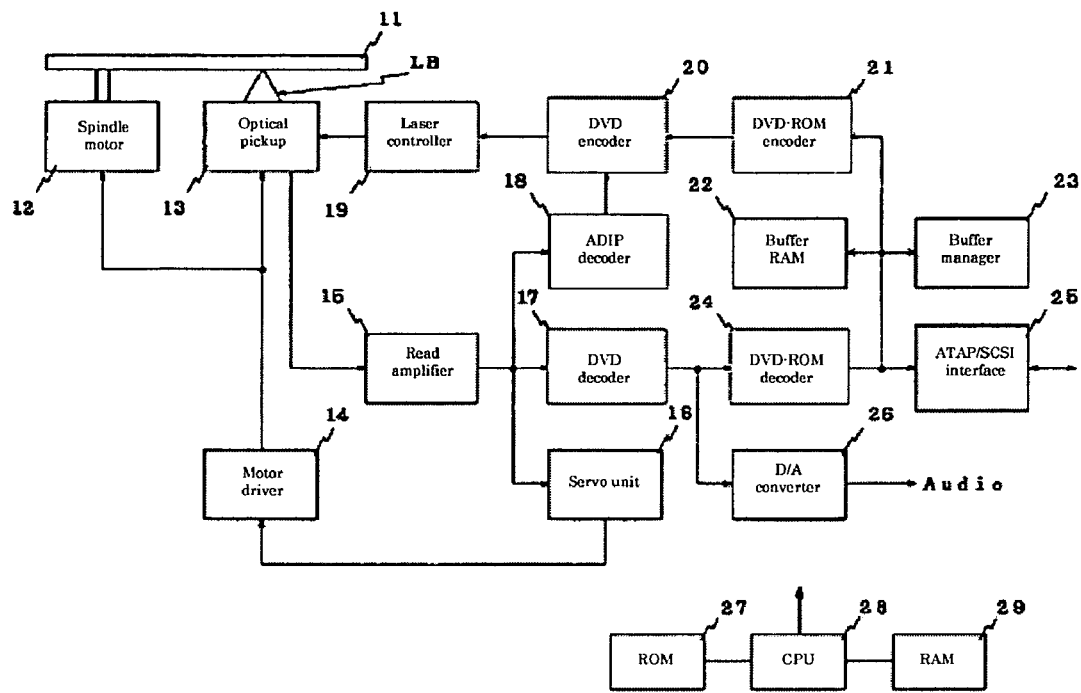
FIG. 6 is a functional block diagram showing an example of the principal portion of an optical disc drive of the present invention.

FIG. 6 is a block diagram exemplarily showing the essential parts of the optical disc drive. In this drawing 11 denotes an optical disc; 12, a spindle motor; 13, an optical pickup; 14, a motor driver; 15, a read amplifier; 16, a servo unit; 17, a DVD decoder; 18, an ADIP decoder; 19, a laser controller; 20, a DVD encoder; 21, a DVD-ROM encoder; 22, a buffer RAM; 23, a buffer manager; 24, a DVD-ROM decoder; 25, an ATAPI/SCSI interface; 26, a D/A converter; 27, a ROM; 28, a CPU; 29, a RAM; LB, a laser beam; and Audio, audio output signals.

In FIG. 6, the arrows indicate the main directions of data flow. For simplification, it is assumed that the CPU 28 controlling the blocks in FIG. 6 is connected to each block by attaching only a heavy line to it. The ROM 27 stores a control program written in codes that can be decoded by the CPU 28. When the optical disc drive is turned on, the program is loaded onto a main memory (not shown), and then the CPU 28 controls each block in accordance with the program and stores data required for control into the RAM 29 on a temporary basis.

The configuration and operation of the optical disc drive are as follows: The optical disc 11 is driven to rotate by the spindle motor 12. The spindle motor 12 is controlled by the motor driver 14 and servo unit 16 in such a way that the linear velocity or angular velocity becomes constant. The linear velocity or angular velocity may be changed stepwise.

The optical pickup 13 incorporates a semiconductor laser, optical system, focus actuator, track actuator, light-receiving device, and position sensor (not shown respectively), and applies the laser beam LB onto the optical disc 11. The optical pickup 13 can be moved in a sledge direction by use of a seek motor. The focus actuator, track actuator and seek motor are controlled by the motor driver 14 and servo unit 16 according to signals both from the light-receiving element and the position sensor in such a way as to locate the spot of the laser beam LB on the intended position of the optical disc 11.

Upon reading, reproduction signals obtained using the optical pickup 13 are amplified and binarized by the read amplifier 15, and inputted to the DVD decoder 17. The binarized data bits thus inputted are reconstructed through a process of 8/16 demodulation at the DVD decoder 17, where recording data bits are treated as sets of 8 bits for conversion into 16 bits. In this case, the binder bits are assigned such that the prior numbers of "1" and "0" are equal on average, which is referred to as "suppression of DC component" by which fluctuations in the slice level of DC cut reproduction signals can be suppressed.

The demodulated data are then subject to deinterleaving and error correction, and transmitted to the DVD-ROM decoder 24 for further error collection for increased data reliability. The data, which have been subjected to error collection twice, are temporarily stored on the buffer RAM 22 by means of the buffer manager 23. When a sufficient amount of data is stored to define sector data, the sector data are then transferred to a host computer (not shown) at a time via an ATAPI/SCSI interface 25. In the case of music data, data outputted from the DVD decoder 17 are inputted in the D/A converter 26, and are readout as analog audio signals "Audio."

Upon writing, the data transmitted from the host computer via the ATAPI/SCSI interface 25 are temporarily stored in the buffer RAM 22 by means of the buffer manager 23. Before the writing operation is started, the laser spot has to be positioned at a write start point. This position can be identified on the basis of signals from wobble tracks previously provided on the optical disc 11.

Note that the write start position can be determined on the basis of land prepits rather than wobble signals for DVD-RW/-Rs, and on the basis of prepits for DVD-RAM/RAM•WOs.

The wobble signal in DVD+RW/R+ contain address information called ADIP (Address In Pre-groove), and is readout by the ADIP decoder 18. The synchronized signal produced by the ADIP decoder 18 is transmitted to the DVD encoder 20, thereby allowing data to be written on accurate positions of the optical disc 11. The data in the buffer RAM 22 are transmitted to the DVD-ROM encoder 21 or DVD encoder 20 for error correction code addition and interleaving. The data are then written in the optical disc 11 with the recording waveform in the present invention by means of the laser controller 19 and the optical pickup 13.

Specifically, a mark of the shortest length is recorded on a recordable DVD medium with wobble grooves by use of a single pulse beam whose front edge is energized; marks other the shortest one are recorded thereon by use of a single pulse beam whose front and rear edges are energized for a given duration of time, the power of the front edge being equal to that of the front edge of pulse for the shortest mark, the power of the rear edge being equal to that of the rear edge of pulse for the shortest mark; and for reproduction of the recorded information by use of a reproduction beam, the irradiation intensity of cooling pulse that comes after the rear edge of pulse during the mark recording is set to 0.1 mW or less for a given duration of time. In this way it is made possible to realize high-quality recording at higher recording linear velocities.

It is also possible to further increase recording quality by setting the duration of cooling pulse that comes after the rear edge of pulse to 1/6 to 6/6 the shortest space length. This is a more preferable cooling pulse duration range.

Moreover, in the recording waveform of the present invention, the heating pulse width of recording pulse for a mark immediately before which there is a space of the shortest length is identified depending on whether the length of that mark is the shortest, and the heating pulse width for the shortest mark is set larger than those for the other longer marks. In addition, the heating-pulse width of recording pulse for a mark of the shortest length is identified depending on whether the space immediately before the shortest mark is of the shortest length, and the heating pulse width for the mark immediately before which there is the shortest space is set smaller than those for the other marks immediately before which there is no space of the shortest length. In this way it is possible to realize high-quality recording, that is, lower jitter.

Note that address information can be retrieved from land prepits or prepits.

Figure 7:
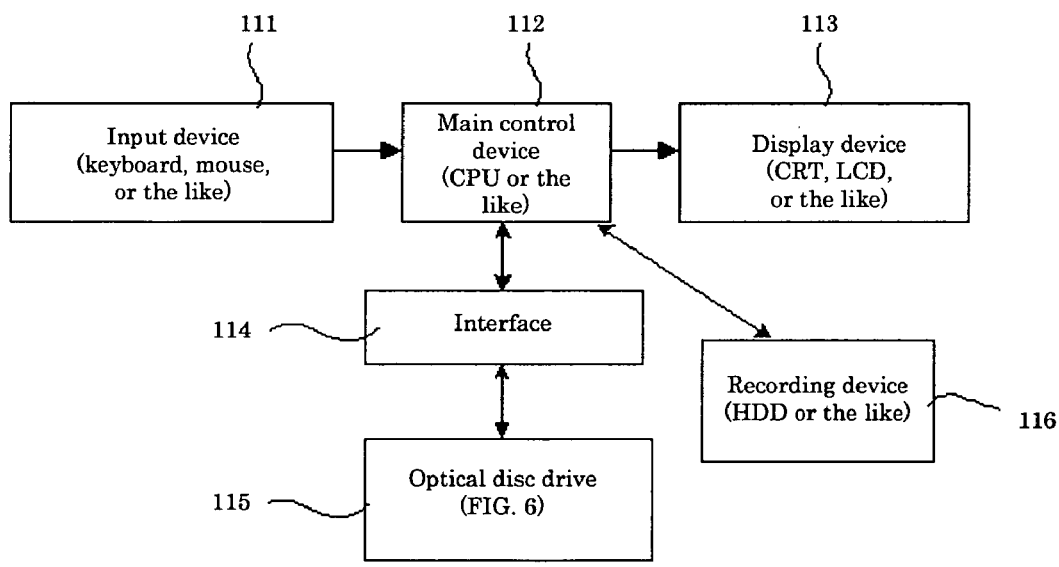
FIG. 7 is a schematic view showing an information processing apparatus using the optical disc drive shown in FIG. 6.

FIG. 7 is a schematic diagram of an information processing apparatus using the optical disc drive shown in FIG. 6. The information processing apparatus includes, for example, a main control device 112, an interface 114, a recording device 116, an input device 111 and a display device 113.

The main control device 112 is composed of, for example, a CPU (central processing unit or microcomputer) and a main memory (respectively not shown), and controls the host computer's overall operation.

The interface 114 is a communication interface for bilateral communication with the optical disc drive, and complies to standard interface such as ATAPI or SCSI. The interface 114 is connected to the foregoing interface 25 (see FIG. 6) of the optical disc drive. The two interfaces may be connected together by means of not only cable connection using a communication line or cable (e.g., SCSI cable), but also by infrared wireless connection or the like.

The recording device 116 (e.g., HDD or hard disc) stores a program written in codes that can be decoded by the microcomputer of the main control device 112. When the driving power source of the information processing apparatus is turned on, the program is loaded onto the main memory of the main control device 112.

The display device 113 is equipped with a display part (not shown) such as a CRT, liquid crystal display (LCD) or plasma display panel (PDP), and displays various information received from the main control device 112.

The input device 111 is equipped with at least one input medium (not shown), such as those selected from a keyboard, mouse, and pointing device, and transmits a variety of user-input information to the main control device 112. Note that information from a loaded medium can be inputted wirelessly. Incidentally, CRTs equipped with a touch panel may be available as an integrated device of the display device 113 and input device 111. The information processing apparatus is equipped with an operating system (OS). Every device constituting the information processing apparatus is controlled by the operating system.

Hereinafter, the present invention will be described with reference to Examples, which however shall not be construed as limiting the invention thereto.

<Preparation of Optical Recording Media>

Polycarbonate resin substrates with the following specification were prepared by injection molding: groove depth=167 nm (1,670 angstroms), half-value width=0.39 μm, track pitch=0.74 μm, wobble frequency equivalent to 32T, thickness=0.6 mm, and outer diameter=120 mm.

Next, the compound having the following structural formula (A) and the compound having the following structural formula (B) were mixed together in the proportion of 70:30 by mass, and the mixture was dissolved in 2,2,3,3-tetrafluoro-1-propanol. The resultant dye solution was applied on the substrates with a spinner, and dried at 90° C. for 30 minutes. Thereby, a dye-containing recording layer of 75 nm (750 angstroms) thickness was formed on the substrates. Here, the initial decomposition temperature of the dye-containing recording layer was 270° C.

Ag was then deposited on the dye-containing recording layer in a thickness of 110 nm (1100 angstroms) by sputtering to form a reflective layer thereon.

With a coating method, a protective layer of 5 μm thickness made of an acrylic photopolymer was formed on the reflective layer.

Subsequently, a flat polycarbonate resin substrate with a thickness of 0.6 mm and an outer diameter of 120 mm prepared by injection molding was bonded to the protective layer using an acrylic photopolymer. In this way optical recording media (dye-based recordable DVD media) were prepared.

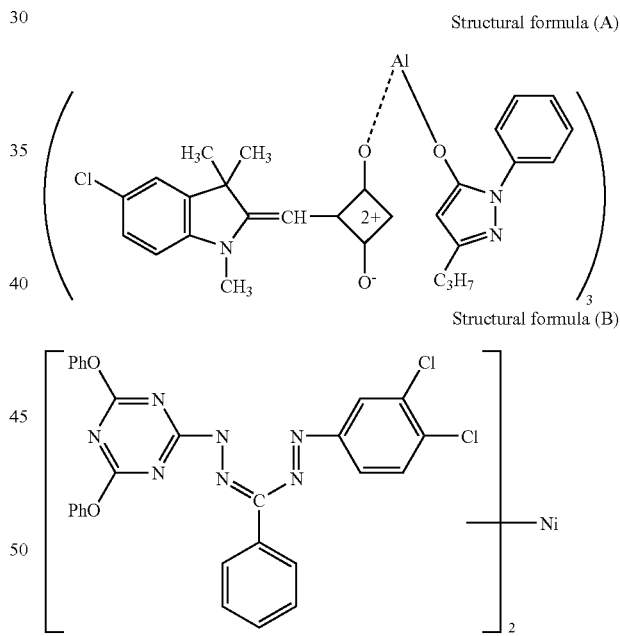

Where Ph represents a phenyl group

Examples 1 to 11

Recording was performed on the resultant optical recording media by use of a semiconductor laser beam of 660 nm oscillating wavelength and 0.90 μm beam diameter; at a recording power sufficient to obtain a minimal bottom jitter, EFM signals (minimal pit length=0.4 μm) were recorded on the optical recording media while performing tracking under the recording conditions and at recording linear velocities shown in Table 3. Thereafter, information was reproduced from the recorded areas, followed by the determination of the jitter value, asymmetry, and number of PI errors. The results are shown in Table 3.

The adopted waveforms of the recording laser beam are shown in FIGS. 4 and 5. In these drawings W0 is the power of the front edge of pulse for each mark, W1 is the power of the rear edge of pulse for each mark, and W2 is the power, without any added power, of pulse for marks other than the shortest one. Furthermore, for pulse durations at linear velocities of 42 m/s and 56 m/s, pulse duration values shown in FIGS. 4 and 5 were employed, respectively.

Note that the refractory index "n" of the dye-containing recording layer for a recording beam of 660 nm wavelength and for a reproduction beam of 660 nm wavelength was 2.29, and the extinction coefficient "k" thereof for these beams was 0.04.

Comparative Example 1

In Comparative Example 1, recording and reproducing operations were performed in a similar manner described in Examples 1 to 12 except that a recording waveform free of cooling pulses was adopted and the recording conditions were changed to those for Comparative Example 1 as shown in Table 3. The obtained results are shown in Table 3.

Comparative Example 2

In Comparative Example 2, recording and reproducing operations were performed in a similar manner described in Examples 1 to 12 except that the irradiation intensity of cooling pulse was set to 0.2 mW and the recording conditions were changed to those for Comparative Example 2 as shown in Table 3. The obtained results are shown in Table 3.

Comparative Example 3

In Comparative Example 3, recording and reproducing operations were performed in a similar manner described in Examples 1 to 12 except that a recording waveform free of cooling pulses was adopted and the recording conditions were changed to those for Comparative Example 3 as shown in Table 3. The obtained results are shown in Table 3.

Comparative Example 4

In Comparative Example 4, recording and reproducing operations were performed in a similar manner described in Examples 1 to 12 except that a simple rectangular pulse was adopted for a mark of the shortest length, the powers of the front and rear edges of pulse for marks other than the shortest one were brought to the same level, and the recording conditions were changed to those for Comparative Example 4 as shown in Table 3. The obtained results are shown in Table 3.

Comparative Example 5

In Comparative Example 5, recording and reproducing operations were performed in a similar manner described in Examples 1 to 12 except that a simple rectangular pulse was adopted for marks other than the shortest one and the recording conditions were changed to those for Comparative Example 5 as shown in Table 3. The obtained results are shown in Table 3.

Comparative Example 6

In Comparative Example 6, recording and reproducing operations were performed in a similar manner described in Examples 1 to 12 except that a simple rectangular pulse was adopted for all marks and the recording conditions were changed to those for Comparative Example 6 as shown in Table 3. The obtained results are shown in Table 3.

TABLE 2

| | | Length of mark to be recorded | |
| --- | --- | --- | --- |
| | | 3 T | 4 T to 14 T |
| Length of space immediately before a mark to be recorded | 3 T | ±0.00 T (not compensated) | −0.05 T |
| | 4 T to 14 T | +0.05 T | ±0.00 T (not compensated) |

TABLE 3

| | Recording linear velocity (m/s) | Waveform | Power of cooling pulse after rear edge (mW) | Cooling pulse duration (T) | W0/W1 | W1/W2 | Jitter | Asymmetry | PI Errors | Compensation in Table 2 |
| --- | --- | --- | --- | --- | --- | --- | --- | --- | --- | --- |
| Ex. 1 | 42 | FIG. 4 | 0.0 | 1.0 | 1.05 | 1.32 | 8.0 | 0.01 | 5 | Compensated |
| Ex. 2 | 42 | FIG. 4 | 0.0 | 1.0 | 1.05 | 1.32 | 9.4 | 0.01 | 21 | Not compensated |
| Ex. 3 | 42 | FIG. 4 | 0.1 | 0.8 | 1.15 | 1.39 | 7.8 | 0.02 | 7 | Compensated |
| Ex. 4 | 56 | FIG. 5 | 0.0 | 2.0 | 1.07 | 1.40 | 7.8 | 0.01 | 6 | Compensated |
| Ex. 5 | 56 | FIG. 5 | 0.0 | 2.0 | 1.04 | 1.29 | 7.6 | −0.01 | 7 | Compensated |
| Ex. 6 | 56 | FIG. 5 | 0.1 | 2.5 | 1.06 | 1.32 | 7.7 | 0.00 | 1 | Compensated |
| Ex. 7 | 56 | FIG. 5 | 0.0 | 2.0 | 1.10 | 1.30 | 7.7 | −0.01 | 8 | Compensated |
| Ex. 8 | 56 | FIG. 5 | 0.0 | 0.4 | 1.20 | 1.37 | 8.4 | −0.05 | 20 | Compensated |
| Ex. 9 | 56 | FIG. 5 | 0.0 | 0.5 | 1.06 | 1.33 | 8.1 | −0.03 | 19 | Compensated |
| Ex. 10 | 56 | FIG. 5 | 0.0 | 1.5 | 1.06 | 1.33 | 7.9 | −0.02 | 9 | Compensated |
| Ex. 11 | 56 | FIG. 5 | 0.0 | 2.0 | 1.06 | 1.33 | 7.8 | 0.00 | 3 | Compensated |
| Compara. Ex. 1 | 42 | FIG. 4 | 0.0 | 0.0 | 1.08 | 1.38 | 8.1 | −0.08 | 53 | Compensated |
| Compara. Ex. 2 | 56 | FIG. 5 | 0.2 | 0.5 | 1.06 | 1.33 | 8.3 | −0.05 | 37 | Compensated |
| Compara. Ex. 3 | 56 | FIG. 5 | 0.0 | 0.0 | 1.06 | 1.33 | 8.4 | −0.10 | 66 | Compensated |

TABLE 3-continued

| | Recording linear velocity (m/s) | Waveform | Power of cooling pulse after rear edge (mW) | Cooling pulse duration (T) | W0/W1 | W1/W2 | Jitter | Asymmetry | PI Errors | Compensation in Table 2 |
|---|---|---|---|---|---|---|---|---|---|---|
| Compara. Ex. 4 | 42 | FIG. 4 | 0.0 | 1.5 | 1.00 | 1.33 | 8.8 | −0.04 | 45 | Compensated |
| Compara. Ex. 5 | 42 | FIG. 4 | 0.0 | 1.5 | 1.06 | 1.00 | 10.1 | −0.11 | 272 | Compensated |
| Compara. Ex. 6 | 42 | FIG. 4 | 0.0 | 1.5 | 1.00 | 1.00 | 10.4 | −0.12 | 288 | Compensated |

It can be learned from the results shown in Table 3 that jitter and asymmetry are, in general, excellent in Examples 1 to 11 compared with those in Comparative Examples 1 to 6, and that the number of PI errors is remarkably small in Examples 1 to 11.

It should be noted in Example 8 that the number of PI errors is slightly large i.e., 20, because the cooling pulse duration was set to 0.4T, which is less than one-sixth of 3T (i.e., 0.5T)—the length of the shortest mark.

Example 12

Recording was performed on the resultant optical recording medium by use of a semiconductor laser beam of 660 nm oscillating wavelength and 0.90 µm beam diameter; at a recording power sufficient to obtain a minimal bottom jitter, EFM signals (minimal pit length=0.4 µm) were recorded on the optical recording medium while performing tracking under the recording conditions and at a recording linear velocity shown in Table 4, with heating pulse width compensation shown in Table 2 being made. Thereafter, information was reproduced from the recorded areas, followed by the determination the jitter value, asymmetry, and number of PI errors. The results are shown in Table 4.

The adopted waveforms of the recording laser beam are shown in FIG. 5. In this drawing W0 is the power of the front edge of pulse for each mark, W1 is the power of the rear edge of pulse for each mark, and W2 is the power, without any added power, of pulse for marks other than the shortest one. Furthermore, for pulse duration at a recording linear velocity of 56 m/s, pulse duration shown in FIG. 5 was employed.

Comparative Examples 7 to 9

Optical recording media were prepared under the same conditions described in Example 12 by use of a sample stamper and molding substrate with different LPPb values of LPP format used in DVD-Rs shown in Table 4, and recording and reproducing operations were made in a similar manner described Example 12. The results are shown in Table 4.

TABLE 4

| | Recording linear velocity (m/s) | Waveform | Power of cooling pulse after rear edge (mW) | Cooling pulse duration (T) | W0/W1 | W1/W2 | Jitter | Asymmetry | PI Errors | LPPb value |
|---|---|---|---|---|---|---|---|---|---|---|
| Ex. 12 | 56 | FIG. 5 | 0 | 1.5 | 1.04 | 1.3 | 7.6 | −0.01 | 4 | Not set |
| Compara. Ex. 7 | 56 | FIG. 5 | 0 | 1.5 | 1.04 | 1.3 | 7.5 | −0.01 | 11 | 0.1 |
| Compara. Ex. 8 | 56 | FIG. 5 | 0 | 1.5 | 1.04 | 1.3 | 7.6 | −0.01 | 48 | 0.24 |
| Compara. Ex. 9 | 56 | FIG. 5 | 0 | 1.5 | 1.04 | 1.3 | 8.3 | −0.01 | 832 | 0.37 |

It can be learned from the results shown in Table 4 that in LPP format samples—even when the jitter value is excellent—show, like Comparative Example 9, regular increases in the number of PI errors as the LPPb value increases, and it has been established that if the LPPb value is less than 0.16, addressing cannot be operated in a recording and reproducing apparatus in which such samples are used.

In Example 12, by contrast, both the jitter value and asymmetry are excellent compared with those in Comparative Examples 7 to 9, and the number of PI errors is remarkably small.

The recording and reproducing method of the present invention for dye-based recordable DVD media, and the recording and reproducing apparatus of the present invention for dye-based recordable DVD media are suitably used for, for example, DVD-RAM•WOs, DVD-Rs, DVD+Rs, DVD-RAMs, DVD-RWs and DVD+RWs. DVD-RWs and DVD+RWs are writable (or recordable) DVDs (Digital Versatile Discs).

What is claimed is:

1. A recording and reproducing method for dye-based recordable DVD media, comprising:
   recording a mark of the shortest length on a dye-containing recording layer by use of a single pulse beam whose front edge is energized;
   recording marks other than the shortest mark on the dye-containing recording layer by use of a single pulse beam whose front and rear edges are energized for a given duration of time, the power of the front edge of pulse being equal to the power of the front edge of pulse for the shortest mark, the power of the rear edge of pulse being equal to the power of the rear edge of pulse for the shortest mark; and
   reproducing recorded information by use of a reproduction beam,
   wherein the irradiation intensity of cooling pulse that comes after the rear edge of pulse at the time of the mark recording is 0.1 mW or less for a given duration of time, and the recording linear velocity is 42 m/s or more, and
   wherein the dye-containing recording layer is disposed on a substrate of a dye-based recordable DVD medium, the substrate having a guide groove with a wobble.

2. The recording and reproducing method for dye-based recordable DVD media according to claim 1, wherein the duration of the cooling pulse that comes after the rear edge of pulse is 1/6 to 6/6 the length of a space of the shortest length.

3. The recording and reproducing method for dye-based recordable DVD media according to claim 1, wherein the heating pulse width of recording pulse for a mark immediately before which there is a space of the shortest length is identified depending on whether the length of the mark is the shortest, and the heating pulse width for the shortest mark is set larger than the heating pulse widths for marks other than the shortest mark, and
   wherein the heating pulse width of recording pulse for a mark of the shortest length is identified depending on whether a space immediately before the shortest mark is of the shortest length, and the heating pulse width for the mark immediately before which there is the shortest space is set smaller than the heating pulse widths for marks immediately before which there is no space of the shortest length.

4. The recording and reproducing method for dye-based recordable DVD media according to claim 1, wherein the wobble has a frequency equivalent to 4T to 96T, where T is a basic clock cycle.

5. The recording and reproducing method for dye-based recordable DVD media according to claim 1, wherein synchronization is performed such that $0.1 \leq Wo/PP \leq 0.4$, where Wo is the amplitude of a wobble signal and PP is the amplitude of a push-pull signal which is a subtraction signal outputted from a two-section photodetector for the detection and control of a track error.

6. The recording and reproducing method for dye-based recordable DVD media according to claim 1, wherein the wavelength of a recording beam is 600 nm to 720 nm.

7. The recording and reproducing method for dye-based recordable DVD media according to claim 1, wherein the dye-containing recording layer has a refractive index "n" in a range of 1.5 to 3.0 and an extinction coefficient "k" in a range of 0.02 to 0.2 for beams whose wavelength is within ±5 nm of the wavelengths of the recording and reproduction beams.

8. The recording and reproducing method for dye-based recordable DVD media according to claim 1, wherein the dye-containing recording layer has an initial decomposition temperature of 100° C. to 360° C.

9. The recording and reproducing method for dye-based recordable DVD media according to claim 1, wherein the dye-based recordable DVD medium comprises on the substrate the dye-containing recording layer and at least one layer selected from the group consisting of a reflective layer, a protective layer, an adhesive layer, a protective substrate and a hard coat layer.

10. The recording and reproducing method for dye-based recordable DVD media according to claim 9, wherein the dye-based recordable DVD medium comprises a reflective layer, and the reflective layer comprises any one of Au, Ag, Al and an alloy composed primarily of Au, Ag and Al.

11. The recording and reproducing method for dye-based recordable DVD media according to claim 9, wherein the dye-based recordable DVD medium comprises a protective layer, and the protective layer comprises a ultraviolet curable resin.

12. The recording and reproducing method for dye-based recordable DVD media according to claim 9, wherein the dye-based recordable DVD medium comprises one of the following layer structures: a layer structure in which at least the dye-containing recording layer, a reflective layer, a protective layer and an adhesive layer are disposed in this order between first and second substrates; and a layer structure in which at least a first dye-containing recording layer, a first reflective layer, a first protective layer, an adhesive layer, a second protective layer, a second reflective layer and a second dye-containing recording layer are disposed in this order between the first and second substrates, and
   wherein the dye-based recordable DVD medium comprises a recording and reproducing surface disposed on at least one surface thereof.

13. The recording and reproducing method for dye-based recordable DVD media according to claim 12, wherein the adhesive layer comprises a ultraviolet curable resin.

14. A recording and reproducing apparatus for dye-based recordable DVD media, comprising:
   a dye-based recordable DVD medium having a substrate which has a guide groove with a wobble, and a dye-containing recording layer on the substrate;
   a recording unit configured to record a mark of the shortest length on the dye-containing recording layer by use of a single pulse beam whose front edge is energized, and record marks other than the shortest mark on the dye-containing recording layer by use of a single pulse beam whose front and rear edges are energized for a given duration of time, the power of the front edge of pulse being equal to the power of the front edge of pulse for the shortest mark, the power of the rear edge of pulse being equal to the power of the rear edge of pulse for the shortest mark; and
   a reproduction unit configured to reproduce recorded information by use of a reproduction beam,
   wherein the irradiation intensity of cooling pulse that comes after the rear edge of pulse at the time of the mark recording is 0.1 mW or less for a given duration of time, and the recording linear velocity is 42 m/s or more.

15. The recording and reproducing apparatus for dye-based recordable DVD media according to claim 14, wherein the duration of the cooling pulse that comes after the rear edge of pulse is 1/6 to 6/6 the length of a space of the shortest length.

16. The recording and reproducing apparatus for dye-based recordable DVD media according to claim 14, wherein the heating pulse width of recording pulse for a mark immediately before which there is a space of the shortest length is identified depending on whether the length of the mark is the shortest, and the heating pulse width for the shortest mark is set larger than the heating pulse widths for marks other than the shortest mark, and wherein the heating pulse width of recording pulse for a mark of the shortest length is identified depending on whether a space immediately before the shortest mark is of the shortest length, and the heating pulse width for the mark immediately before which there is the shortest space is set smaller than the heating pulse widths for marks immediately before which there is no space of the shortest length.

* * * * *